United States Patent
Honda et al.

(10) Patent No.: US 10,017,195 B2
(45) Date of Patent: Jul. 10, 2018

(54) COMMUNICATION DEVICE, TRAIN NETWORK SYSTEM, AND NETWORK SETTING METHOD

(71) Applicant: MITSUBISHI ELECTRIC CORPORATION, Chiyoda-ku, Tokyo (JP)

(72) Inventors: Shingo Honda, Tokyo (JP); Tetsuo Komura, Tokyo (JP); Shogo Tatsumi, Tokyo (JP); Takuya Sawa, Tokyo (JP); Takashi Miyauchi, Tokyo (JP); Yusuke Ishimaru, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 188 days.

(21) Appl. No.: 15/112,847

(22) PCT Filed: Jan. 27, 2014

(86) PCT No.: PCT/JP2014/051693
§ 371 (c)(1),
(2) Date: Jul. 20, 2016

(87) PCT Pub. No.: WO2015/111223
PCT Pub. Date: Jul. 30, 2015

(65) Prior Publication Data
US 2016/0339933 A1    Nov. 24, 2016

(51) Int. Cl.
*B61L 15/00* (2006.01)
*B60L 15/42* (2006.01)
(Continued)

(52) U.S. Cl.
CPC .......... *B61L 15/0018* (2013.01); *B60L 15/42* (2013.01); *B61L 15/0036* (2013.01);
(Continued)

(58) Field of Classification Search
CPC ............. B61L 15/0018; B61L 15/0072; H04L 12/4645; H04L 12/4641; H04L 67/12
See application file for complete search history.

(56) References Cited

U.S. PATENT DOCUMENTS 9,787,633 B2 * 10/2017 Bhagwat ............. H04L 61/2061
2010/0302974 A1 * 12/2010 Niiyama ................ G07C 5/008
370/254
(Continued)

FOREIGN PATENT DOCUMENTS

EP    2 591 974 A2    5/2013
JP    10-303903 A    11/1998
(Continued)

OTHER PUBLICATIONS

International Search Report (PCT/ISA/210) dated Apr. 22, 2014, by the Japanese Patent Office as the International Searching Authority for International Application No. PCT/JP2014/051693.
(Continued)

*Primary Examiner* — Jason C Smith
(74) *Attorney, Agent, or Firm* — Buchanan Ingersoll & Rooney PC

(57) ABSTRACT

A communication device operating as a hub in a train network system that includes a plurality of hubs installed in train vehicles, each of the plurality of hubs belonging to both a trunk network in which a signal transmission range is not limited and a branch network in which a signal transmission range is limited, and adding, to a signal to be transmitted to a hub belonging to the same branch network as it does, network type information indicating whether the signal is a trunk network signal or a branch network signal. The communication device transmitting branch network information including at least identification information on a branch network to which it belongs at a predetermined timing, and based on branch network information received
(Continued)

from an adjacent communication device, determining whether or not to add the network type information to a signal to be transmitted to the adjacent communication device.

6 Claims, 8 Drawing Sheets

(51) Int. Cl.
    *H04L 12/46*     (2006.01)
    *H04L 29/08*     (2006.01)
    *H04L 12/40*     (2006.01)

(52) U.S. Cl.
    CPC ...... *B61L 15/0072* (2013.01); *H04L 12/4641* (2013.01); *H04L 12/4645* (2013.01); *H04L 67/12* (2013.01); *B60L 2200/26* (2013.01); *B61L 15/0027* (2013.01); *B61L 2205/00* (2013.01); *H04L 2012/40293* (2013.01); *Y02T 90/16* (2013.01)

(56) References Cited

U.S. PATENT DOCUMENTS

| | | | | |
|---|---|---|---|---|
| 2013/0058253 A1* | 3/2013 | Maruta | ............... | H04L 12/4625 370/254 |
| 2015/0165930 A1* | 6/2015 | Sawa | ........................ | B60L 7/26 701/19 |
| 2015/0191090 A1* | 7/2015 | Sawa | ...................... | B60L 1/003 701/19 |
| 2015/0195103 A1* | 7/2015 | Shigeeda | ............ | H04L 12/4641 370/392 |
| 2015/0244543 A1* | 8/2015 | Shigeeda | ................ | H04L 12/40 370/390 |
| 2015/0341204 A1* | 11/2015 | Tatsumi | ............ | H04L 12/40182 370/228 |
| 2016/0339933 A1* | 11/2016 | Honda | .................... | B60L 15/42 |

FOREIGN PATENT DOCUMENTS

| | | |
|---|---|---|
| JP | 2005-117373 A | 4/2005 |
| JP | 2011-010279 A | 1/2011 |
| JP | 2011-205777 A | 10/2011 |
| JP | 2013-102624 A | 5/2013 |
| WO | WO 2011/118320 A1 | 9/2011 |

OTHER PUBLICATIONS

Written Opinion (PCT/ISA/237) dated Apr. 22, 2014, by the Japanese Patent Office as the International Searching Authority for International Application No. PCT/JP2014/051693.

\* cited by examiner

COMMUNICATION DEVICE, TRAIN NETWORK SYSTEM, AND NETWORK SETTING METHOD

FIELD

The present invention relates to a train network system that realizes communications between various apparatuses in railroad vehicles, and in particular, relates to communication devices that operate as hubs forming a network.

BACKGROUND

Communications using virtual local area networks (VLANs) have been performed to separate a single transmission cable into different networks. For example, a network constructed in a train consists of a trunk transmission line extending over all vehicles and one or more branch transmission lines divided for apparatuses or each type of apparatus in a plurality of vehicles. In order to reduce cost and avoid complexity in cable wiring, in some cases, a vehicle network with a single physical transmission cable in which a trunk network is separated from one or more branch networks is constructed.

For example, Patent Literature 1 uses a VLAN technique to limit the broadcast frame transmission range (transferred range). Patent Literature 2 applies VLANs thereby to use fewer LAN cables.

CITATION LIST

Patent Literature

Patent Literature 1: Japanese Patent Application Laid-Open No. 2011-205777
Patent Literature 2: Japanese Patent Application Laid-Open No. 2011-010279

SUMMARY

Technical Problem

However, since the above conventional arts do not consider a case where the physical configuration of a network is changed (for example, a case where trains are connected or a case where a new vehicle is interposed between vehicles of a train), there is a problem as below.

Specifically, there is a problem that when a vehicle is added to a train or when a new vehicle is interposed between vehicles of a train, communications in a trunk network (hereinafter, referred to as trunk communications) become unsuccessful unless the network settings of a communication device installed in a vehicle that is changed in connection relationship are changed manually, for example.

Train network systems generally have the function of bypassing a communication device for communications when an abnormality occurs in the communication device (bypass circuit). When an abnormality occurs in a communication device that is connected to an adjacent communication device belonging to a VLAN different from the VLAN to which it belongs, and is set to perform only trunk communications with the adjacent communication device, the bypassing function works, causing another problem that trunk communications become impossible.

The present invention has been made in view of the above, and has an object of providing communication devices capable of realizing a train network system in which even when a physical connection relationship in a network is changed, communications up to that time can be continued.

Solution to Problem

To solve the problems and achieve the object, the present invention provides a communication device operating as a hub in a train network system that includes a plurality of hubs installed in train vehicles, each of the plurality of hubs belonging to both a trunk network in which a signal transmission range is not limited and a branch network in which a signal transmission range is limited, and adding, to a signal to be transmitted to a hub belonging to the same branch network as it does, network type information indicating whether the signal is a trunk network signal or a branch network signal. The communication device transmits branch network information including at least identification information on a branch network to which it belongs at a predetermined timing, and based on branch network information received from an adjacent communication device, determines whether or not to add the network type information to a signal to be transmitted to the adjacent communication device.

Advantageous Effects of Invention

The present invention achieves an effect of being able to realize a train network system that allows a change in network configuration to be detected and setting to be changed to continue trunk communications.

DESCRIPTION OF EMBODIMENTS

Hereinafter, embodiments of a communication device, a train network system, and a network setting method according to the present invention will be described in detail with reference to the drawings. The present invention is not limited to the embodiments.

First Embodiment

Figure 1:
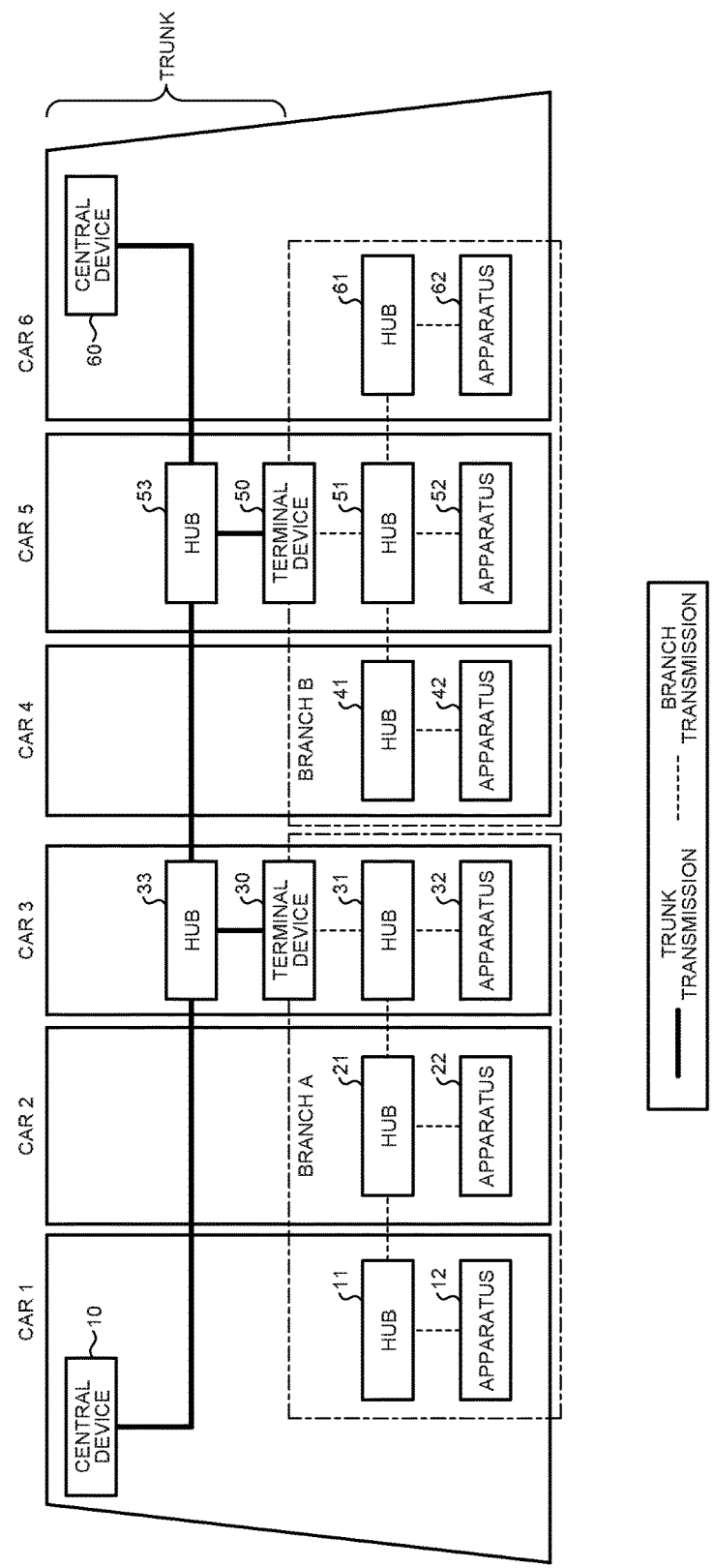
FIG. 1 is a diagram illustrating a configuration example of a train network system.

FIG. 1 is a diagram illustrating a first configuration example of a train network system. The train network system illustrated in FIG. 1 includes a central device 10, a HUB 11, and an apparatus 12 installed in Car 1, a HUB 21 and apparatus 22 installed in Car 2, a terminal device 30, a HUB 31, an apparatus 32, and a HUB 33 installed in Car 3, a HUB 41 and an apparatus 42 installed in Car 4, a terminal device 50, a HUB 51, an apparatus 52, and a HUB 53 installed in Car 5, and a central device 60, a HUB 61, and an apparatus 62 installed in Car 6. These devices (central devices, terminal devices, HUBs, apparatuses) have communication functions. Examples of the apparatuses 12, 22, 32, 42, 52, 62 include brake devices, display devices, air-conditioning equipment, and lighting equipment.

The train network system illustrated in FIG. 1 also includes a trunk transmission line extending over all vehicles (trunk network) and a plurality of branch transmission lines extending over some vehicles (branch networks). In the train network system, the central devices 10, 60 and the terminal devices 30, 50 communicate with each other using the trunk network. The apparatuses 12, 22, 32 and the terminal device 30 communicate with each other using a branch network A (branch A). The apparatuses 42, 52, 62 and the terminal device 50 communicate with each other using a branch network B (branch B).

The train network system illustrated in FIG. 1 is an example where a trunk network and branch networks are configured without using VLANs.

Figure 2:
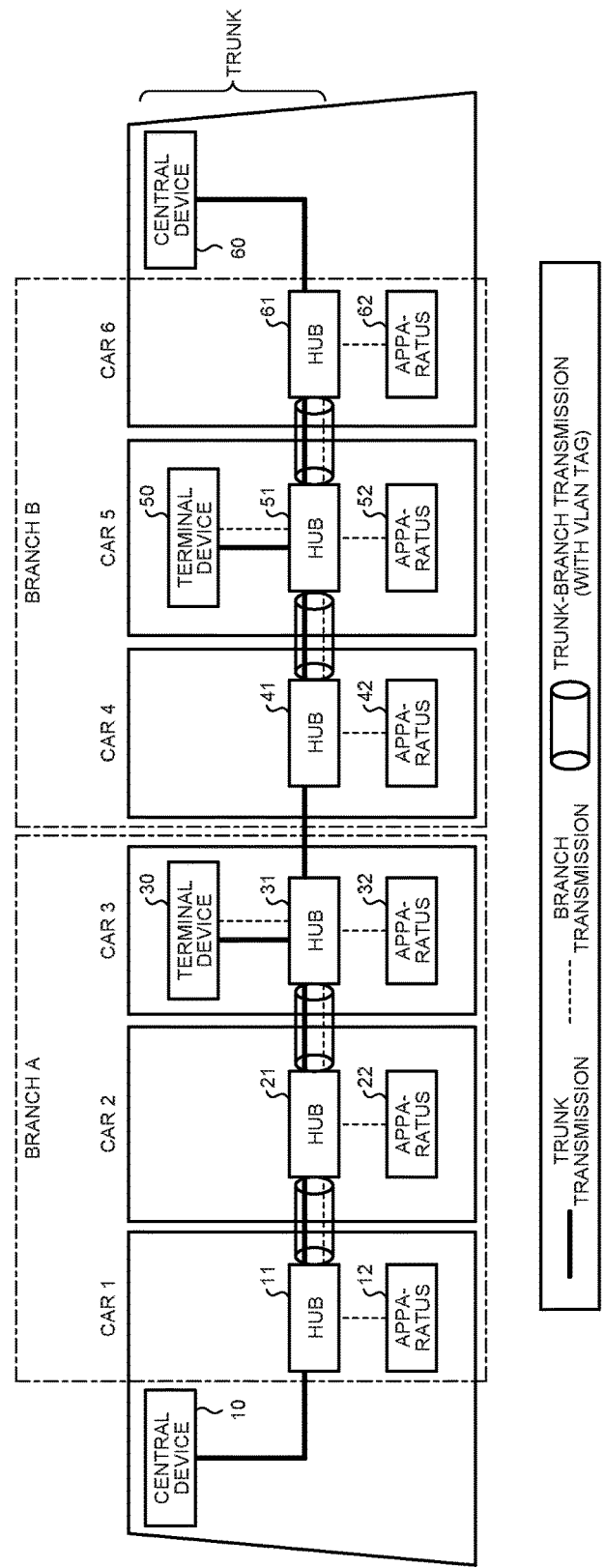
FIG. 2 is a diagram illustrating a configuration example of a train network system.

FIG. 2 is a diagram illustrating a second configuration example of a train network system. The same components as those illustrated in FIG. 1 are denoted by the same reference numerals. The train network system illustrated in FIG. 2 includes a central device 10, a HUB 11, and an apparatus 12 installed in Car 1, a HUB 21 and an apparatus 22 installed in Car 2, a terminal device 30, a HUB 31, and an apparatus 32 installed in Car 3, a HUB 41 and an apparatus 42 installed in Car 4, a terminal device 50, a HUB 51, and an apparatus 52 installed in Car 5, and a central device 60, a HUB 61, and an apparatus 62 installed in Car 6.

In the train network system in FIG. 2, as in the train network system in FIG. 1, the central devices 10, 60 and the terminal devices 30, 50 communicate with each other using a trunk network, the apparatuses 12, 22, 32 and the terminal device 30 communicate with each other using a branch network A, and the apparatuses 42, 52, 62 and the terminal device 50 communicate with each other using a branch network B.

The train network system illustrated in FIG. 2 is an example where a trunk network and two branch networks are configured using VLANs. Using VLANs as in FIG. 2 allows a single cable to be shared by a plurality of networks (a trunk network and branch networks), and eliminates the need for the HUBs 33 and 53 illustrated in FIG. 1, resulting in cost reduction.

The train network system according to the present embodiment adopts the second configuration illustrated in FIG. 2. Here, basic operations of the devices (central devices, terminal devices, HUBs, and apparatuses) will be described.

In the train network system illustrated in FIG. 2, the central devices 10 and 60 are connected to a trunk transmission line, and generate a frame containing control information (e.g. a brake instruction) directed to apparatuses (the apparatuses 12, 22, 32, 42, 52, 62) in the train (hereinafter, referred to as a control information frame) according to an instruction from the driver's cab not illustrated or the like, and transmit it to the trunk transmission line. The control information frame reaches the terminal devices 30 and 50 via the trunk transmission line. After receiving the control information frame, the terminal devices 30 and 50 transfer the control information frame to the apparatuses in the branch networks to which they belong. When the terminal devices 30 and 50 receive frames transmitted by the apparatuses in the branch networks to the central devices (hereinafter, referred to as apparatus information frames) via the HUBs, they transfer the apparatus information frames to the destination central devices. The terminal devices process control frames and apparatus information frames to be transferred as needed to transfer.

When the HUBs 11, 21, 31, 41, 51, and 61, communication devices according to the present invention, receive frames from adjacent other devices (central devices, terminal devices, apparatuses, HUBs), they transfer them to the destinations. At this time, when the transfer destinations are devices other than the HUBs belonging to the same branch networks (VLANs) as they do, they transmit frames to which no VLAN tags are added. When they receive tagged frames whose transfer destinations are devices other than the HUBs belonging to the same VLANs as they do, they transfer the frames after removing the VLAN tags added. On the other hand, when the transfer destinations are HUBs belonging to the same VLANs as they do, they add VLAN tags appropriate to the frame types to the frames to transmit. Specifically, to frames transmitted and received using the trunk network (trunk transmission frames transmitted over all the vehicles of the train), a VLAN tag assigned to the trunk network is added for transmission. To frames transmitted and received using a branch network (branch transmission frames transmitted only to vehicles belonging to the same branch network), a VLAN tag assigned to the branch network is added for transmission. When a tagged frame is received, it is transferred as it is.

For example, when the HUB 11 in FIG. 2 receives a control information frame from the central device 10, the HUB 11 transfers it to the HUB 21 after adding a VLAN tag indicating trunk transmission (a VLAN tag assigned to the trunk network) since the received frame is a trunk transmission frame. When the HUB 11 receives from the HUB 21 a frame to which a VLAN tag indicating trunk transmission is added (hereinafter, referred to as a trunk transmission tagged frame), directed to the central device 10, the HUB 11 transfers it to the central device 10 after removing the VLAN tag.

For example, when the HUB 31 in FIG. 2 receives a trunk transmission tagged frame from the HUB 21, the HUB 31 transfers it to a transfer destination corresponding to the address of the frame, specifically, both of or one of the terminal device 30 and the HUB 41 (a HUB belonging to a VLAN different from that of the HUB 31) after removing the VLAN tag. When the HUB 31 receives from the HUB 21 a frame to which a VLAN tag indicating branch transmission (a VLAN tag assigned to a branch network) is added (hereinafter, referred to as a branch transmission tagged frame), the HUB 31 transfers it to a transfer destination corresponding to the address of the frame, specifically, both of or one of the terminal device 30 and the apparatus 32 after removing the VLAN tag. When the HUB 31 receives from the HUB 41 belonging to a VLAN different from that of the HUB 31 a frame, which corresponds to a trunk transmission frame, the HUB 31 transfers it to the HUB 21 after adding a VLAN tag indicating trunk transmission. At this time, when it is necessary to transfer the frame also to the terminal device 30, the HUB 31 transfers it to the terminal device 30 without adding a VLAN tag.

The apparatuses 12, 22, 32, 42, 52, and 62 execute operations according to control information or the like contained in frames transmitted from the central device 10 or 60.

The above is the basic operations of the devices constituting the train network system illustrated in FIG. 2.

When the configuration illustrated in FIG. 2 is adopted, there is a problem as already described, specifically, a problem that trouble occurs in communications in the trunk network (trunk communications) when the physical connection relationship between HUBs in the train network system is changed due to the addition of a vehicle to the train, the interposition of a new vehicle, a failure in a device (HUB) assuming the responsibility of communications between vehicles, or the like. Therefore, the HUBs in the present embodiment exchange information on network settings between the adjacent HUBs, thereby detecting a change in connection relationship and changing their network settings or operation settings as needed.

The operation of the HUBs (the HUBs 11, 21, 31, 41, 51, and 61 illustrated in FIG. 2), communication devices according to the present invention, will be described in detail below with reference to FIGS. 3 to 5.

Figure 3:
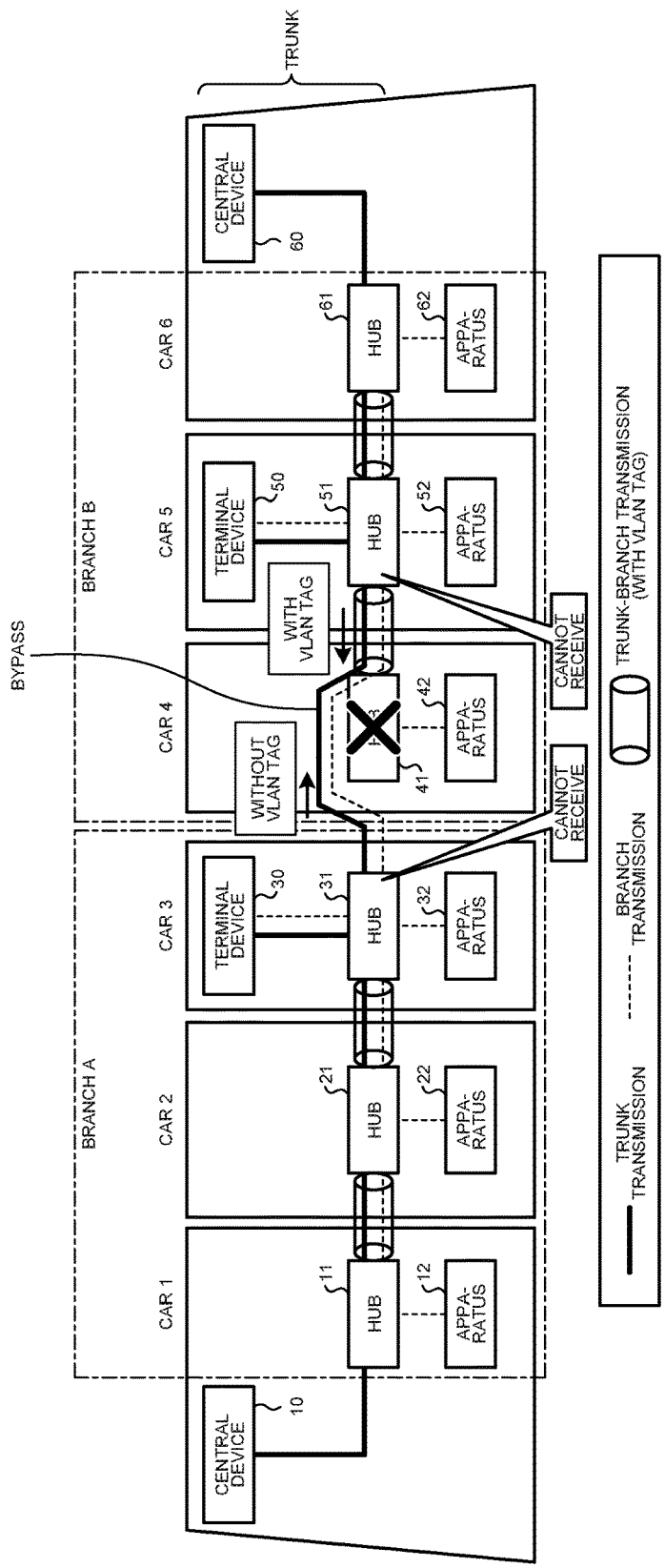
FIG. 3 is a diagram illustrating an example of a communication operation immediately after a HUB located at the boundary of branch networks fails.
Figure 4:
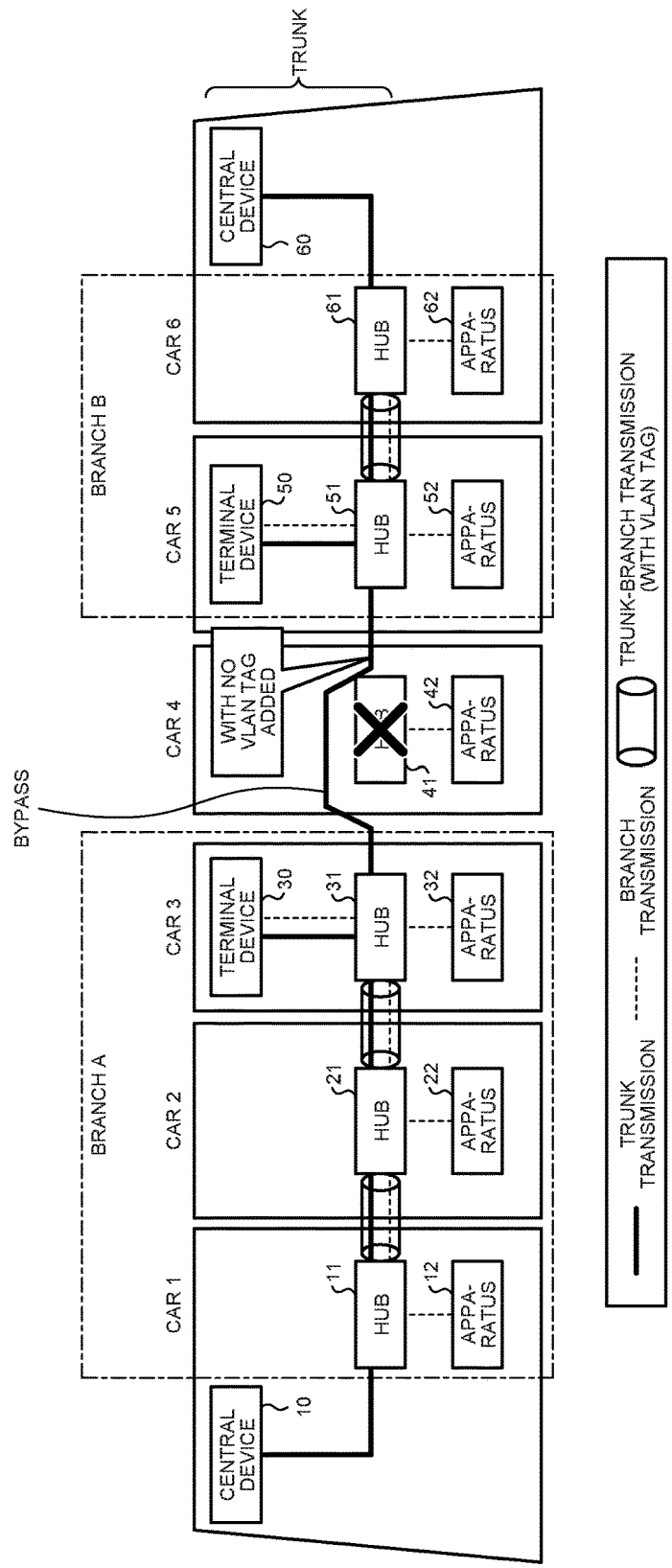
FIG. 4 is a diagram illustrating an example of a communication operation after a certain period of time has elapsed since the failure illustrated in FIG. 3 occurred.

FIG. 3 is a diagram illustrating an example of a communication operation immediately after a HUB located at the boundary of branch networks fails. FIG. 4 is a diagram illustrating an example of a communication operation after a certain period of time has elapsed since the failure illustrated in FIG. 3 occurred. FIG. 5 is a flowchart illustrating an operation example of a HUB. The flowchart illustrated in FIG. 5 illustrates an operation example of a HUB that has completed network setting and performs trunk transmission and branch transmission normally.

The HUBs in the present embodiment exchange branch network configuration information (corresponding to the information on the network settings described above) with the adjacent HUBs, and change the VLAN settings as needed. Specifically, as illustrated in FIG. 5, when each HUB detects a timing to transmit branch network configuration information (hereinafter, referred to as branch network information) (step S11: Yes), it transmits branch network information to an adjacent HUB (step S12). The branch network information includes identification information on the branch network to which it belongs, identification information on a VLAN set for the branch network (VID: VLAN ID), and others. Branch network information is transmitted periodically. Branch network information is also transmitted on startup.

Each HUB monitors whether branch network information is transmitted from an adjacent HUB. When it receives branch network information from an adjacent HUB (step S13: Yes), it checks whether the network configuration (physical connection relationship) has been changed (step S14). For the determination of whether the network configuration has been changed or not, for example, a HUB holds branch network information pieces received from adjacent HUBs last time, and when it newly receives branch network information pieces, it compares them to the ones held to determine the presence or absence of change. Alternatively, by comparing branch network information pieces received from adjacent HUBs, it determines whether it is located at the boundary of the branch networks or not, and further determines whether the operation settings are appropriate to the determination result or not.

When the network configuration has not been changed (step S14: No), the HUB waits for the next branch network information transmission timing or transmission of branch network information from an adjacent HUB. On the other hand, when the network configuration has been changed (step S14: Yes), the HUB changes the operation settings (step S15). Specifically, when a branch network to which an adjacent HUB belongs is changed and the adjacent HUB belongs to a branch network different from that of the HUB, the HUB changes the operation settings so as not to add a VLAN tag when it transmits a trunk transmission frame to the adjacent HUB. Conversely, when a branch network to which an adjacent HUB belongs is changed and the adjacent HUB belongs to the same branch network as the HUB does, the HUB changes the operation settings so as to transfer a branch transmission frame (a branch transmission tagged frame) to the adjacent HUB, and also changes the operation settings so as to transmit a trunk transmission tagged frame when it transmits a trunk transmission frame to the adjacent HUB.

For example, as illustrated in FIG. 3, suppose that, of the HUB 31 and the HUB 41 located at the boundary of the different branch networks, a device failure occurs in the HUB 41, causing a trouble in the communication function, and a bypass circuit directly connecting the HUB 31 and the HUB 51 on both sides of the HUB 41 works. A circuit for bypassing a failed HUB when the HUB fails is a known technique, and has already commonly been used in networks constructed in trains. Thus the description of that is omitted.

Immediately after the HUB 41 is bypassed, the HUB 31 located at the boundary with the different branch network transmits a trunk transmission frame to the branch network B side without adding a VLAN tag, and this reaches the HUB 51. The HUB 51 transmits a trunk transmission frame to which a VLAN tag is added (a trunk transmission tagged frame) to the branch network A side. In this case, both the HUB 31 and the HUB 51 cannot receive the trunk transmission frames. This is because the HUB 31 recognizes that it is located at the boundary between the branch networks, and is set to transmit and receive trunk transmission frames without VLAN tags to and from the adjacent HUB on the branch network B side. On the other hand, the HUB 51 recognizes that it is not located at the boundary between the branch networks, and is set to transmit and receive trunk transmission frames with VLAN tags to and from the adjacent HUB on the branch network A side. This state where the settings of the HUB 51 do not match the actual network configuration results in a state where trunk transmission frames cannot be transmitted and received between the different branch networks.

Figure 5:
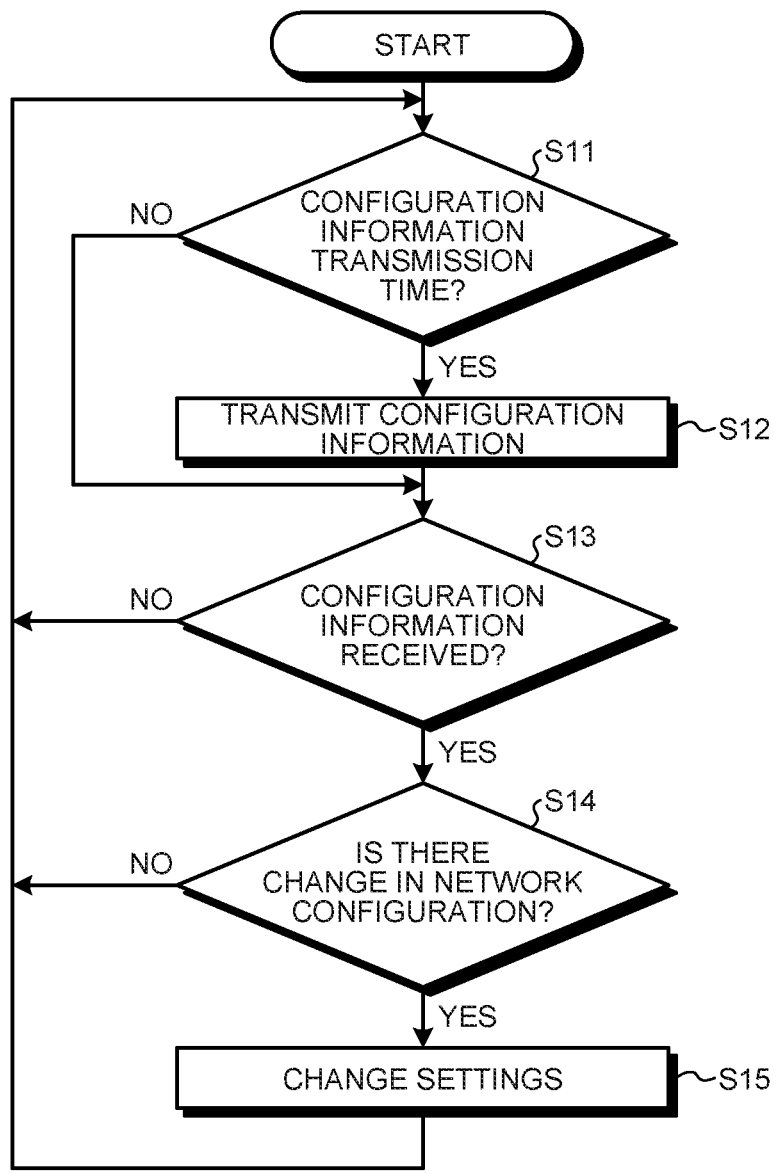
FIG. 5 is a flowchart illustrating an operation example of a HUB.

However, as already described, each HUB executes the operation illustrated in FIG. 5 at a predetermined timing to exchange branch network information with an adjacent HUB. Therefore, immediately after the HUB 41 is bypassed, the transmission and reception of trunk transmission frames between the branch networks become temporarily impossible. However, when the HUB 51 receives branch network information transmitted by the HUB 31, the HUB 51 detects that it is located at the boundary of the branch networks A and B, and changes the operation settings. As a result, as illustrated in FIG. 4, when the HUB 51 transmits a trunk transmission frame to the branch network A side, the HUB 51 transmits it without adding a VLAN tag, and receives a trunk transmission frame without a VLAN tag. Thus, the transmission and reception of trunk transmission frames can be performed normally.

Thus, in the train network system in the present embodiment, the HUBs transmit branch network information including at least identification information on the VLANs set for the branch networks to which they belong, to the adjacent HUBs at a predetermined timing, thereby exchanging branch network information with the adjacent HUBs. This allows detection of a change in network configuration to change settings according to the detection result, thus allows trunk communications to be continued even when the network configuration is changed due to a failure of a HUB located at the boundary between branch networks.

Second Embodiment

A train network system in a second embodiment will be described. The configuration of the train network system is the same as that in the first embodiment (see FIG. 1). In the present embodiment, differences from the first embodiment will be described.

The first embodiment has been described on the case where the HUB located at the boundary of the branch networks A and B fails and is bypassed. In the present embodiment, the operation of HUBs when a new vehicle is interposed between vehicles of a train will be described. The following description describes a case where one vehicle is interposed. The same applies to a case where a plurality of vehicles connected is interposed.

Figure 6:
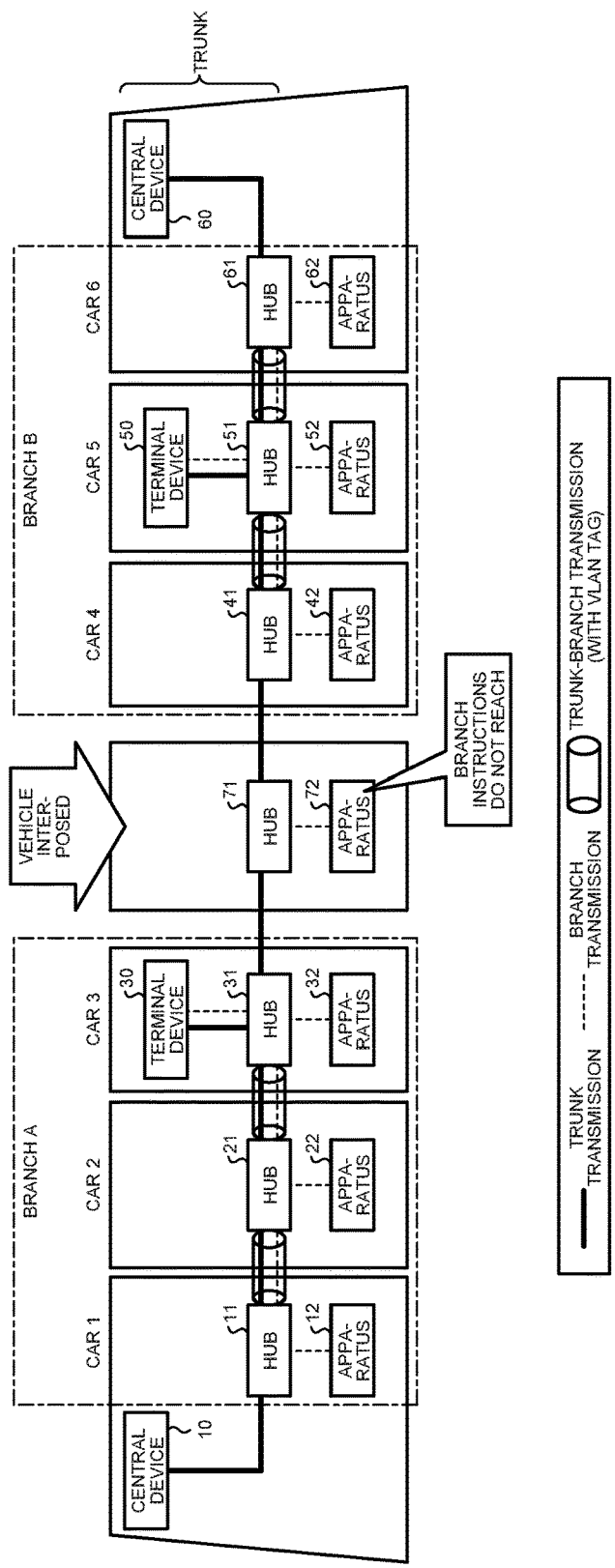
FIG. 6 is a diagram illustrating an example of a communication operation immediately after a new vehicle is interposed at the boundary of branch networks.
Figure 7:
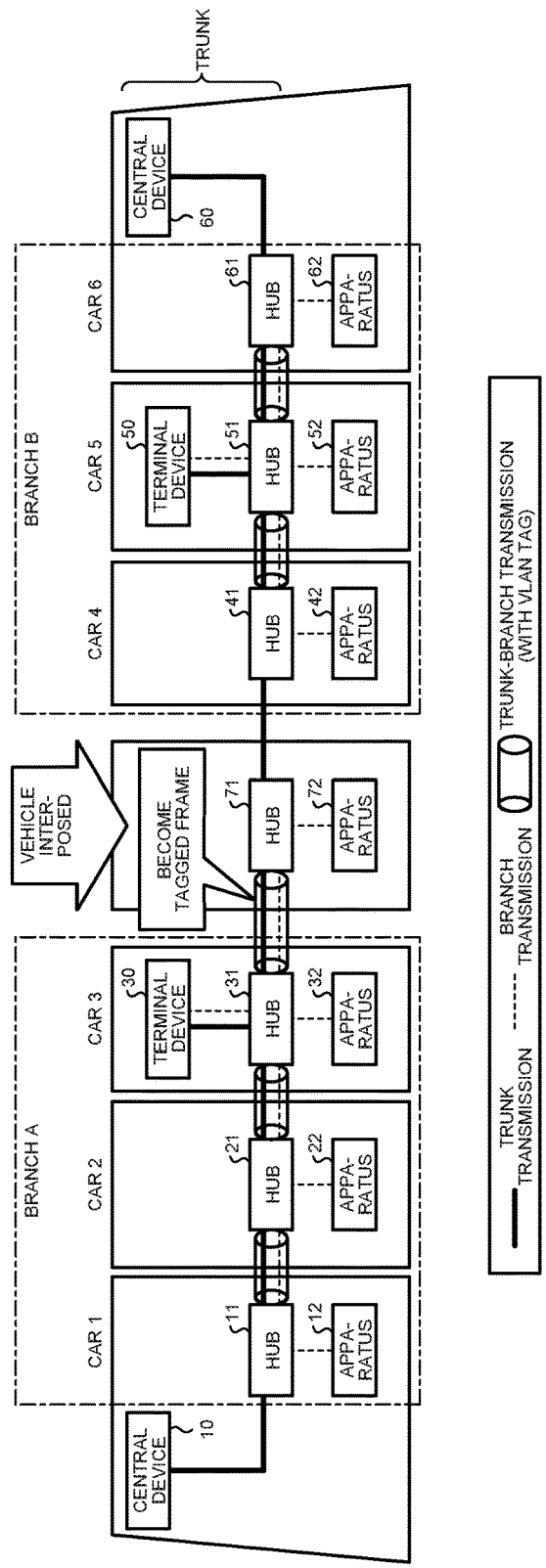
FIG. 7 is a diagram illustrating an example of a communication operation after a certain period of time has elapsed since the vehicle was interposed.
Figure 8:
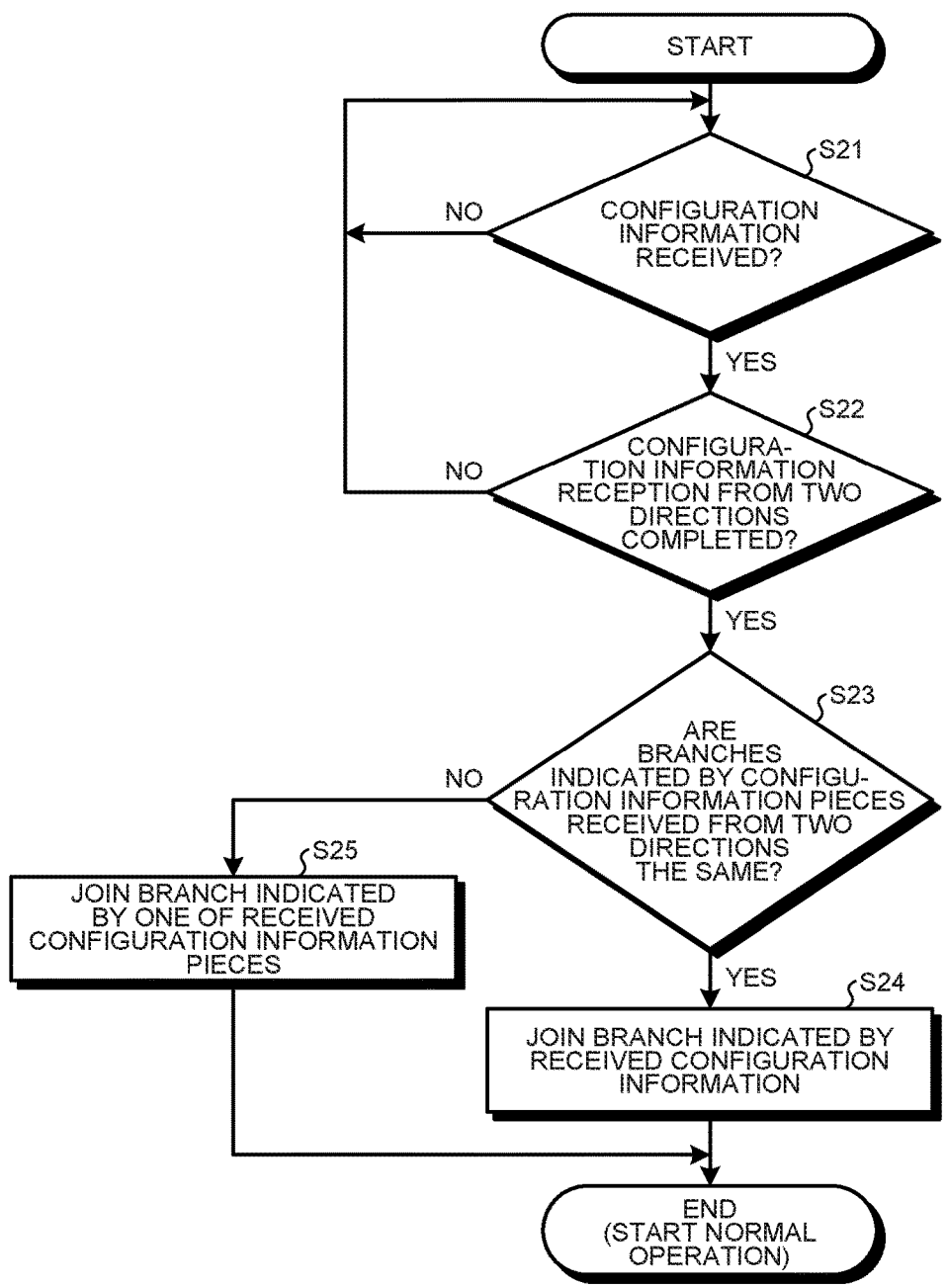
FIG. 8 is a flowchart illustrating an operation example of a HUB installed in the vehicle interposed.

FIG. 6 is a diagram illustrating an example of a communication operation immediately after a new vehicle is interposed at the boundary of branch networks. In the vehicle interposed, a HUB 71 and an apparatus 72 are installed. FIG. 7 is a diagram illustrating an example of a communication operation after a certain period of time has elapsed since the vehicle was interposed. Specifically, it is a diagram illustrating an example of a communication operation after network setting is completed in the HUB 71 in the interposed vehicle. FIG. 8 is a flowchart illustrating an operation example of the HUB 71 installed in the interposed vehicle. Suppose that HUBs installed in existing vehicles (HUBs 11, 21, 31, 41, 51, 61) other than a vehicle interposed operate according to FIG. 5 referred to in the description of the first embodiment. Suppose that branch network information transmitted by the HUBs installed in the existing vehicles in the present embodiment includes information necessary to perform VLAN setting of a branch network. Suppose that on the HUB 71 installed in the interposed vehicle, setting of a VLAN corresponding to a branch network has not been performed at all.

When the HUB 71 of the vehicle interposed in the train receives branch network information (step S21: Yes), it checks whether branch network information reception from two directions has been completed, that is, whether it has received branch network information from both adjacent devices (HUBs) (step S22). When the reception from the two directions has not been completed (step S22: No), it continues to wait for reception of branch network information. When branch network information reception from the two directions has been completed (step S22: Yes), it checks whether branch networks indicated by the two branch network information pieces received from the two directions agree (step S23). That is, it checks whether the branch networks to which the two adjacent devices individually belong are the same or not. When the branch networks agree (step S23: Yes), the HUB 71 decides to join the branch network indicated by the two branch network information pieces, and performs VLAN setting based on the received branch network information (step S24). In VLAN setting, for example, the presence or absence of VLANs at ports, VLAN tags, filter conditions, and others are set. On the other hand, when the branch networks do not agree (step S23: No), it selects one of the branch networks indicated by the two branch network information pieces received from the two directions to join, and performs VLAN setting (step S25). In this case, since the HUB 71 is located at the boundary with a different branch network, it performs operation setting so that when it receives a trunk transmission tagged frame, it removes the tag and then transfers it to the other branch network side (the side of the branch network that it does not join), and performs operation setting so that when it receives a branch transmission tagged frame, it does not transfer it to the other branch network side.

For example, as illustrated in FIG. 6, suppose that a vehicle is interposed between Car 3 and Car 4. In this case, the HUB 71 of the interposed vehicle does not belong to either the branch network A or B. Thus instructions directed into the branch networks (branch transmission frames) do not reach.

However, as already described, the existing HUBs (the HUBs 11, 21, 31, 41, 51, 61) perform the operation illustrated in FIG. 5 in the first embodiment at a predetermined timing to transmit branch network information. Thus, branch network information pieces transmitted from the adjacent HUBs 31 and 41 reach the newly interposed HUB 71. Since the HUB 71 executes the operation illustrated in FIG. 8, it performs VLAN setting when it receives branch network information pieces transmitted from the adjacent HUBs so as to belong to a branch network. For example, when the HUB 71 belongs to a branch network A, branch network information indicating that reaches the HUB 31. As a result, the HUB 31 recognizes that its location is not at the boundary with a different branch network, and changes the settings to add a VLAN tag to a trunk transmission frame and a branch transmission frame to be transmitted to the HUB 71 side as illustrated in FIG. 7.

In the flow in FIG. 8, the HUB waits until it receives branch network information pieces from two directions, and compares the received two branch network information pieces, thereby determining whether or not its interposed position (the position of the newly interposed HUB) is the boundary between different branch networks. Alternatively, the HUB may perform VLAN setting according to branch network information received first. In this case, after performing VLAN setting, the HUB executes an operation similar to the operation described in the first embodiment (the flow illustrated in FIG. 5), thereby to determine whether it is a HUB at the boundary or not, and changes operation settings as needed. For example, when the HUB receives branch network information indicating a branch network different from the branch network to which it belongs, the HUB determines that it is located at the boundary, and performs operation setting so as not to transfer a branch transmission frame to a HUB on the side of the other branch network different from the branch network to which it belongs, and performs operation setting so that when the HUB transmits a trunk transmission frame to the HUB on the other branch network side, the HUB transmits it without adding a VLAN tag.

Thus, in the train network system in the present embodiment, a HUB having joined a branch network transmits branch network information including information necessary for setting to join the branch network to which it belongs to an adjacent HUB at a predetermined timing, and exchanges branch network information with the adjacent HUB. Further, when a vehicle is interposed in a train, a HUB installed in the interposed vehicle receives branch network information transmitted by an adjacent HUB, and performs VLAN setting based on the received branch network information. This provides an effect similar to that of the first embodiment, and allows a HUB installed in a vehicle interposed in a train to automatically perform network setting.

The present embodiment has been described supposing that on the HUB 71 installed in the interposed vehicle, setting of a VLAN corresponding to a branch network has not been performed at all. However, there can be a case where some VLAN setting corresponding to a branch network has been performed on the HUB 71. In order to accommodate such a case, all the HUBs including the newly interposed HUB 71 may be configured to execute the operation according to the flow illustrated in FIG. 8 when they receive branch network information after undergoing a state where they cannot receive branch network information at all from both directions over a certain period of time, that is, when a state where they do not receive branch network information at all from both adjacent apparatuses continues for a certain period of time, for example. Alternatively, a HUB may be configured to compare branch networks to which HUBs on both sides belong (adjacent branch networks) and a branch network to which it belongs (current branch network), and when the current branch network is different from both of the adjacent branch networks, to execute the operation according to the flow illustrated in FIG. 8. Thus, by detecting the state where the HUB has not been able to receive branch network information at all from both directions over a certain period of time, or the state where a branch network to which it belongs is different from both branch networks to which HUBs on both sides belong, the HUB can detect that the vehicle in which it is installed is interposed in a train.

Although the embodiments have been described on the train network system of a configuration in which one HUB is installed in each vehicle, it may be of a configuration in which two or more HUBs are installed in each vehicle. Although the case where the number of branch networks is two has been described, it may be three or more.

INDUSTRIAL APPLICABILITY

As above, communication devices according to the present invention are useful to realize a train network system that realizes communications between various apparatuses installed in railroad vehicles, and are particularly suitable for HUBs constituting a train network.

REFERENCE SIGNS LIST

10, 60 central device, 11, 21, 31, 33, 41, 51, 53, 61, 71 HUB, 12, 22, 32, 42, 52, 62, 72 apparatus, 30, 50 terminal device

The invention claimed is:

1. A communication device in a train network system that includes a plurality of hubs installed in train vehicles, each of the plurality of hubs belonging to both a trunk network in which a signal transmission range is not limited and a branch network in which a signal transmission range is limited, and adding, to a signal to be transmitted to a hub belonging to the same branch network as it does, network type information indicating whether the signal is a trunk network signal or a branch network signal, the communication device operating as one of the hubs, the communication device transmitting branch network information including at least identification information on a branch network to which it belongs at a predetermined timing, and based on branch network information received from an adjacent communication device, determining whether or not to add the network type information to a signal to be transmitted to the adjacent communication device.

2. The communication device according to claim 1, wherein the branch network information includes information necessary for setting to join the branch network.

3. The communication device according to claim 2, wherein when the communication device in a state of not having joined a branch network receives the branch network information from an adjacent communication device, based on the received branch network information, the communication device determines a branch network to join and performs setting of the branch network.

4. The communication device according to claim 1, wherein the trunk network and the branch network are realized by VLANs, and the network type information is a VLAN tag.

5. A train network system comprising a plurality of hubs installed in train vehicles, each of the plurality of hubs belonging to both a trunk network in which a signal transmission range is not limited and a branch network in which a signal transmission range is limited, and adding, to a signal to be transmitted to a hub belonging to the same branch network as it does, network type information indicating whether the signal is a trunk network signal or a branch network signal, wherein each of the hubs transmits branch network information including at least identification information on a branch network to which it belongs at a predetermined timing, and based on branch network information received from an adjacent hub, determines whether or not to add the network type information to a signal to be transmitted to the adjacent hub.

6. A network setting method in a train network system that includes a plurality of hubs installed in train vehicles, each of the plurality of hubs belonging to both a trunk network in which a signal transmission range is not limited and a branch network in which a signal transmission range is limited, and adding, to a signal to be transmitted to a hub belonging to the same branch network as it does, network type information indicating whether the signal is a trunk network signal or a branch network signal, the network setting method comprising:

an information transmission step, by a hub having joined a branch network, of transmitting branch network information including information necessary for setting to newly join the branch network to which the hub have joined; and a setting step, by a hub not yet having joined a branch network, of determining a branch network to join and performing setting of the branch network, based on the branch network information transmitted in the information transmission step.

* * * * *